(12) United States Patent
Yang et al.

(10) Patent No.: US 10,274,759 B2
(45) Date of Patent: Apr. 30, 2019

(54) METHOD FOR MANUFACTURING A RUBBING ROLLER

(71) Applicants: Boe Technology Group Co., Ltd., Beijing (CN); Beijing Boe Optoelectronics Technology Co., Ltd., Beijing (CN)

(72) Inventors: Yan Yang, Beijing (CN); Sunghun Song, Beijing (CN); Jian Li, Beijing (CN)

(73) Assignees: BOE TECHNOLOGY GROUP CO., LTD., Beijing (CN); BEIJING BOE OPTOELECTRONICS TECHNOLOGY GROUP CO., LTD., Beijing (CN)

(*) Notice: Subject to any disclaimer, the term of this patent is extended or adjusted under 35 U.S.C. 154(b) by 308 days.

(21) Appl. No.: 15/123,721

(22) PCT Filed: Dec. 14, 2015

(86) PCT No.: PCT/CN2015/097235
§ 371 (c)(1),
(2) Date: Sep. 6, 2016

(87) PCT Pub. No.: WO2017/028414
PCT Pub. Date: Feb. 23, 2017

(65) Prior Publication Data
US 2017/0176783 A1    Jun. 22, 2017

(30) Foreign Application Priority Data
Aug. 18, 2015  (CN) .......................... 2015 1 0506465

(51) Int. Cl.
*G02F 1/13* (2006.01)
*G02F 1/1337* (2006.01)

(52) U.S. Cl.
CPC ...... *G02F 1/1303* (2013.01); *G02F 1/133784* (2013.01); *Y10T 29/49551* (2015.01)

(58) Field of Classification Search
CPC ............ G02F 1/1303; G02F 1/133784; D03D 27/00–27/2718; Y10T 29/49544; Y10T 29/49551
(Continued)

(56) References Cited

U.S. PATENT DOCUMENTS

| 5,879,497 A | 3/1999 | Nakahara et al. |
| 6,313,897 B1 * | 11/2001 | Murayama ........ G02F 1/133784 349/123 |
| 8,838,005 B2 * | 9/2014 | Kashiwakura ..... G03G 21/0094 15/230 |

FOREIGN PATENT DOCUMENTS

| CN | 101221321 | 7/2008 |
| CN | 101546068 A | 9/2009 |

(Continued)

OTHER PUBLICATIONS

English Machine Translation of CN101221321(A), Eiji Yorida, Jul. 16, 2008.*
(Continued)

*Primary Examiner* — Sarang Afzali
(74) *Attorney, Agent, or Firm* — Calfee, Halter & Griswold LLP

(57) ABSTRACT

The embodiments of the present invention provide a rubbing roller and a manufacturing method thereof. The rubbing roller comprises a rubbing cloth and a cylindrical roller body. A surface of the rubbing cloth is provided with a tuft array. The rubbing cloth is obliquely wound around the cylindrical surface of the roller body, thereby increasing the density of rubbing loci generated by the tufts. In the embodiments of the invention, with the rubbing cloth obliquely wound around the surface of the roller body, in the rubbing (Continued)

orientation process, the density of the rubbing loci can be increased without increasing the rubbing tuft density of existing rubbing cloth.

4 Claims, 3 Drawing Sheets

(58) Field of Classification Search
USPC .............. 492/29, 28, 30, 35, 48, 53, 55, 59; 29/895, 895.211
See application file for complete search history.

(56) References Cited

FOREIGN PATENT DOCUMENTS

| | | |
|---|---|---|
| CN | 201917740 U | 8/2011 |
| CN | 102629026 A | 8/2012 |
| CN | 104656314 | 5/2015 |
| CN | 105093695 | 11/2015 |
| JP | 2009237343 | 10/2009 |
| JP | 2012159731 A | 8/2012 |

OTHER PUBLICATIONS

First Office Action for Chinese Patent Application No. 201510506465.9 dated Jul. 26, 2017.
Second Office Action for Chinese Patent Application No. 201510506465.9 dated Apr. 8, 2018.
International Search Report and Written Opinion from PCT/CN15/097235 dated May 13, 2016.

* cited by examiner

METHOD FOR MANUFACTURING A RUBBING ROLLER

RELATED APPLICATIONS

The present application is the U.S. national phase entry of PCT/CN2015/097235, with an international filing date of Dec. 14, 2015, which claims the benefit of Chinese Patent Application No. 201510506465.9, filed on Aug. 18, 2015, the entire disclosures of which are incorporated herein by reference.

FIELD OF THE INVENTION

The present invention relates to the field of display technology, particularly to a rubbing roller and manufacturing method thereof.

BACKGROUND OF THE INVENTION

Rubbing orientation process is the most widely used orientation process in the liquid crystal display technology. This process is also mature and reliable. The essence of rubbing orientation process comprises: coating an orientation film material on a substrate, forming an orientation film with a curing process, rubbing the orientation film along a certain direction with a rubbing cloth, thereby arranging the molecular side chain of the orientation film in a certain direction, and enabling an ordered arrangement for the liquid crystal molecules based on the direction of the molecular side chain of the orientation film. In this manner, liquid crystal molecules filled between the array substrate and/or the color film substrate are arranged orderly based on a certain direction.

The commercially available rubbing cloth has a fixed size and rubbing tuft distribution. Generally, as shown in FIG. 1, the commercially available rubbing cloth 100 has a rectangular shape; the surface of the rubbing cloth is provided with a plurality of tufts 101 in the form of a matrix, which are used for rubbing orientation. Typically, a commercially available rubbing cloth is wound on a rubbing roller with a side of the rubbing cloth being parallel to the axis of the rubbing roller. Under existing conditions, improving the linear density of the rubbing orientation requires rubbing cloth with a higher rubbing tuft density. However, in order to obtain rubbing cloth with a higher rubbing tuft density and a higher quality, there is a long development cycle with many technical difficulties.

SUMMARY OF THE INVENTION

The embodiments of the present invention provide a rubbing roller and a manufacturing method thereof. The density of the rubbing loci can thus be increased without increasing the rubbing tuft density of existing rubbing cloth.

An embodiment of the present invention provides a rubbing roller. The rubbing roller comprises a rubbing cloth and a cylindrical roller body; a surface of the rubbing cloth is provided with a tuft array; the rubbing cloth is obliquely wound around the cylindrical surface of the roller body, thereby increasing the density of rubbing loci generated by the tufts.

In the embodiment of the invention, with the rubbing cloth obliquely wound around the surface of the roller body, in the rubbing orientation process, the density of the rubbing loci can be increased without increasing the rubbing tuft density of existing rubbing cloth.

Optionally, the rubbing cloth has a rectangular shape; rows and columns composed of the tufts are respectively parallel to the adjacent sides of the rubbing cloth; a predetermined angle $\theta$ is formed between a length direction of the rubbing cloth and the generatrix of the cylindrical surface.

Optionally, the width of the rubbing cloth is: the perimeter of the roller body×cos $\theta$.

Optionally, $0°<\theta\leq 30°$.

Optionally, $\theta=10°$ or $\theta=20°$. Alternatively, $\theta=30°$.

An embodiment of the present invention provides a method for manufacturing a rubbing roller. The method comprises: providing a rubbing cloth and a cylindrical roller body; a surface of the rubbing cloth being provided with a tuft array; and winding the rubbing cloth obliquely around the cylindrical surface of the roller body, thereby increasing the density of rubbing loci generated by the tufts.

In the embodiment of the invention, with the rubbing cloth obliquely wound around the surface of the roller body, in the rubbing orientation process, the density of the rubbing loci can be increased without increasing the rubbing tuft density of existing rubbing cloth.

Optionally, the rubbing cloth has a rectangular shape; rows and columns composed of the tufts are respectively parallel to the adjacent sides of the rubbing cloth; a predetermined angle $\theta$ is formed between a length direction of the rubbing cloth and the generatrix of the cylindrical surface.

Optionally, the original width of the rubbing cloth is equal to the perimeter of the roller body; before winding the rubbing cloth obliquely around the cylindrical surface of the roller body, the method further comprises: tailoring the width of the rubbing cloth to the perimeter of the roller body×cos $\theta$.

Optionally, $0°<\theta\leq 30°$.

Optionally, $\theta=10°$ or $\theta=20°$. Alternatively, $\theta=30°$.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
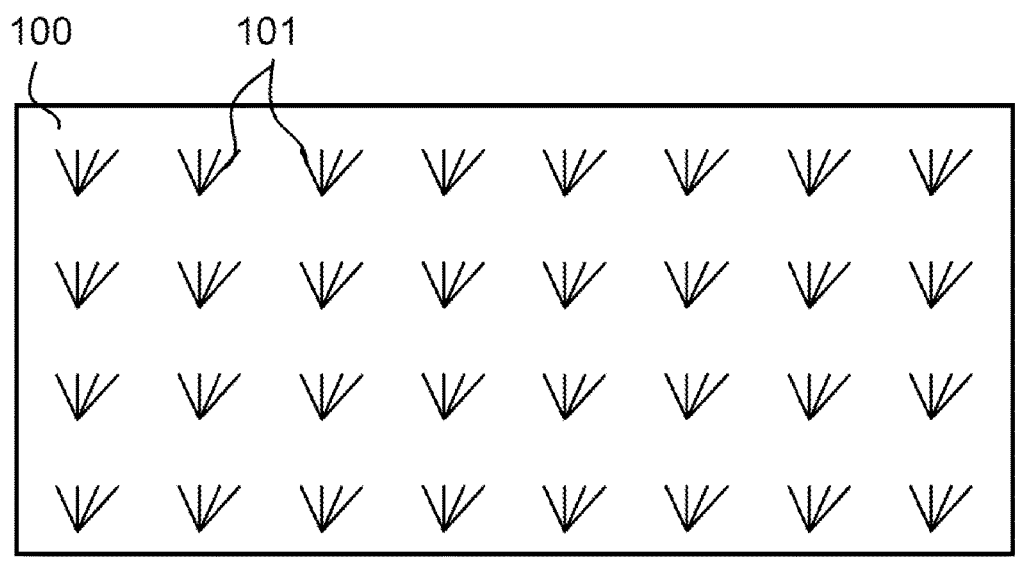
FIG. 1 is a structural schematic diagram of a rubbing cloth in the prior art.
Figure 2:
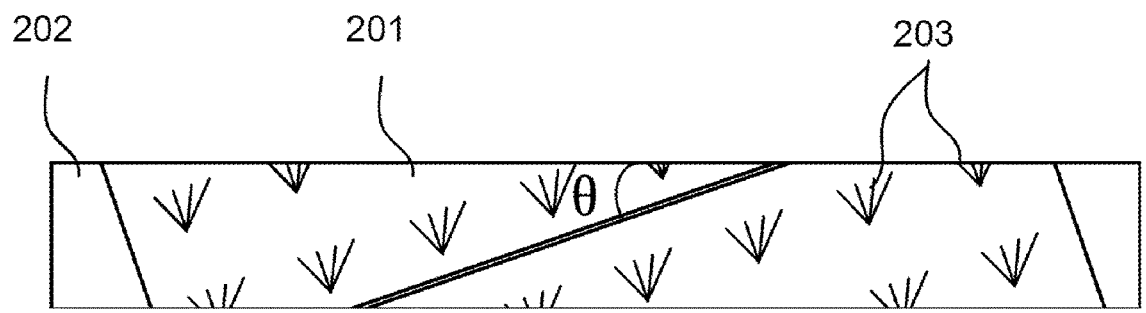
FIG. 2 is a structural schematic diagram of a rubbing roller provided by an embodiment of the present invention.

FIG. 2 is a structural schematic diagram of a rubbing roller provided by an embodiment of the present invention. As shown in FIG. 2, the rubbing roller comprises a rubbing cloth 201 and a cylindrical roller body 202; a surface of the rubbing cloth 201 is provided with a tuft array (formed with the tufts 203); the rubbing cloth 201 is obliquely wound around the cylindrical surface of the roller body 202, thereby increasing the density of rubbing loci generated by the tufts 203.

In the embodiment of the invention, with the rubbing cloth obliquely wound around the surface of the roller body, in the rubbing orientation process, the density of the rubbing loci can be increased without increasing the rubbing tuft density of existing rubbing cloth.

The rubbing cloth can be attached to the rubbing roller with e.g. double-sided adhesive. The rubbing cloth can comprise a basal film and rubbing tufts. Along the rubbing direction, rubbing loci can be obtained due to the rubbing roller surface attached with the rubbing cloth, which rubbing loci are formed by the movement track of each tuft along the rubbing direction. With a higher density of the rubbing loci, the rubbing uniformity is better; the defects caused by a low density of the rubbing loci can then be eliminated, improving the image quality of the liquid crystal display.

Optionally, the rubbing cloth has a rectangular shape; rows and columns composed of the tufts are respectively parallel to the adjacent sides of the rubbing cloth; a predetermined angle θ is formed between a length direction of the rubbing cloth and the generatrix of the cylindrical surface.

Optionally, the width of the rubbing cloth is: the perimeter of the roller body×cos θ.

It should be noted that the existing rubbing cloth typically has an original width equal to the perimeter of the roller body. After the rubbing cloth is obliquely wound around the cylindrical surface of the roller body as taught by the embodiment of the invention, the rubbing cloth may be partially overlapped on the surface of the rubbing roller (as the region indicated with b in FIG. 4). Therefore, the existing rubbing cloth can be tailored to avoid the partial overlapping.

Optionally, 0°<θ≤30°.

The azimuth angle of the rubbing direction should be considered with the azimuth angle of the rubbing cloth and the oblique angle θ. If the oblique angle θ is out of the range of 0°~30°, there may be a risk of other defects on the image quality.

Optionally, θ=10° or θ=20°. Alternatively, θ=30°.

According to the experimental results shown in table 1, it is confirmed that the approach provided by the embodiments of the invention improves the image quality of liquid crystal display significantly.

TABLE 1

|  | Examples | | | |
| --- | --- | --- | --- | --- |
|  | Reference (conventional arrangement) | Example 1 | Example 2 | Example 3 |
| Oblique angle | 0° | 10° | 20° | 30° |
| Increased multiple for the density of the rubbing loci | 1 | 1.0154 | 1.0642 | 1.1547 |
| Defective rate | 3.4 | 1.8 | 1.5 | 1.4 |

Figure 3:
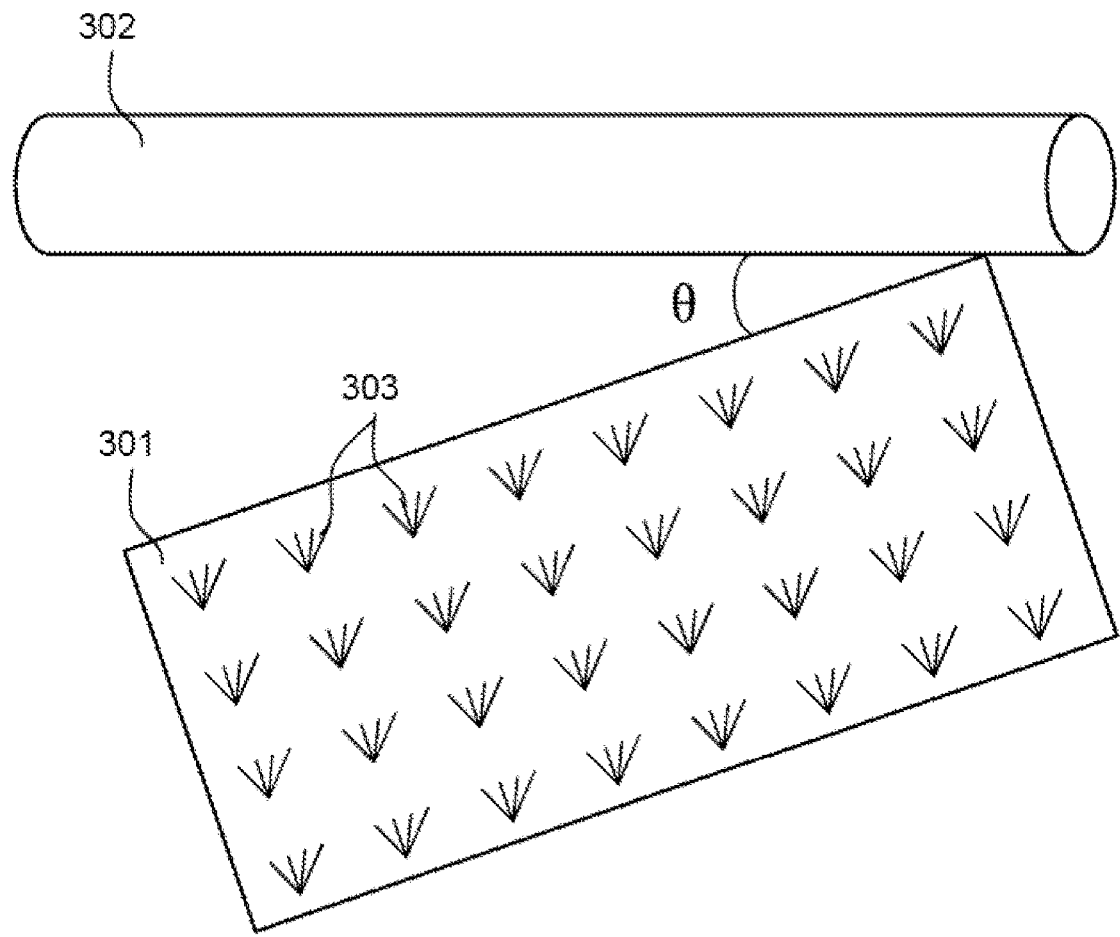
FIG. 3 is a schematic diagram of a method for manufacturing a rubbing roller provided by an embodiment of the present invention.

FIG. 3 is a schematic diagram of a method for manufacturing a rubbing roller provided by an embodiment of the present invention. As shown in FIG. 3, the method comprises: providing a rubbing cloth 301 and a cylindrical roller body 302; a surface of the rubbing cloth 301 being provided with a tuft array (formed with the tufts 303); and winding the rubbing cloth 301 obliquely around the cylindrical surface of the roller body 302, thereby increasing the density of rubbing loci generated by the tufts 303.

In the embodiment of the invention, with the rubbing cloth obliquely wound around the surface of the roller body, in the rubbing orientation process, the density of the rubbing loci can be increased without increasing the rubbing tuft density of existing rubbing cloth.

The rubbing cloth can be attached to the rubbing roller with e.g. double-sided adhesive. The rubbing cloth can comprise a basal film and rubbing tufts. Along the rubbing direction, rubbing loci can be obtained due to the rubbing roller surface attached with the rubbing cloth, which rubbing loci are formed by the movement track of each tuft along the rubbing direction. With a higher density of the rubbing loci, the rubbing uniformity is better; the defects caused by a low density of the rubbing loci can then be eliminated, improving the image quality of the liquid crystal display.

Optionally, the rubbing cloth 301 has a rectangular shape; rows and columns composed of the tufts 303 are respectively parallel to the adjacent sides of the rubbing cloth 301; a predetermined angle θ is formed between a length direction of the rubbing cloth 301 and the generatrix of the cylindrical surface.

Figure 4:
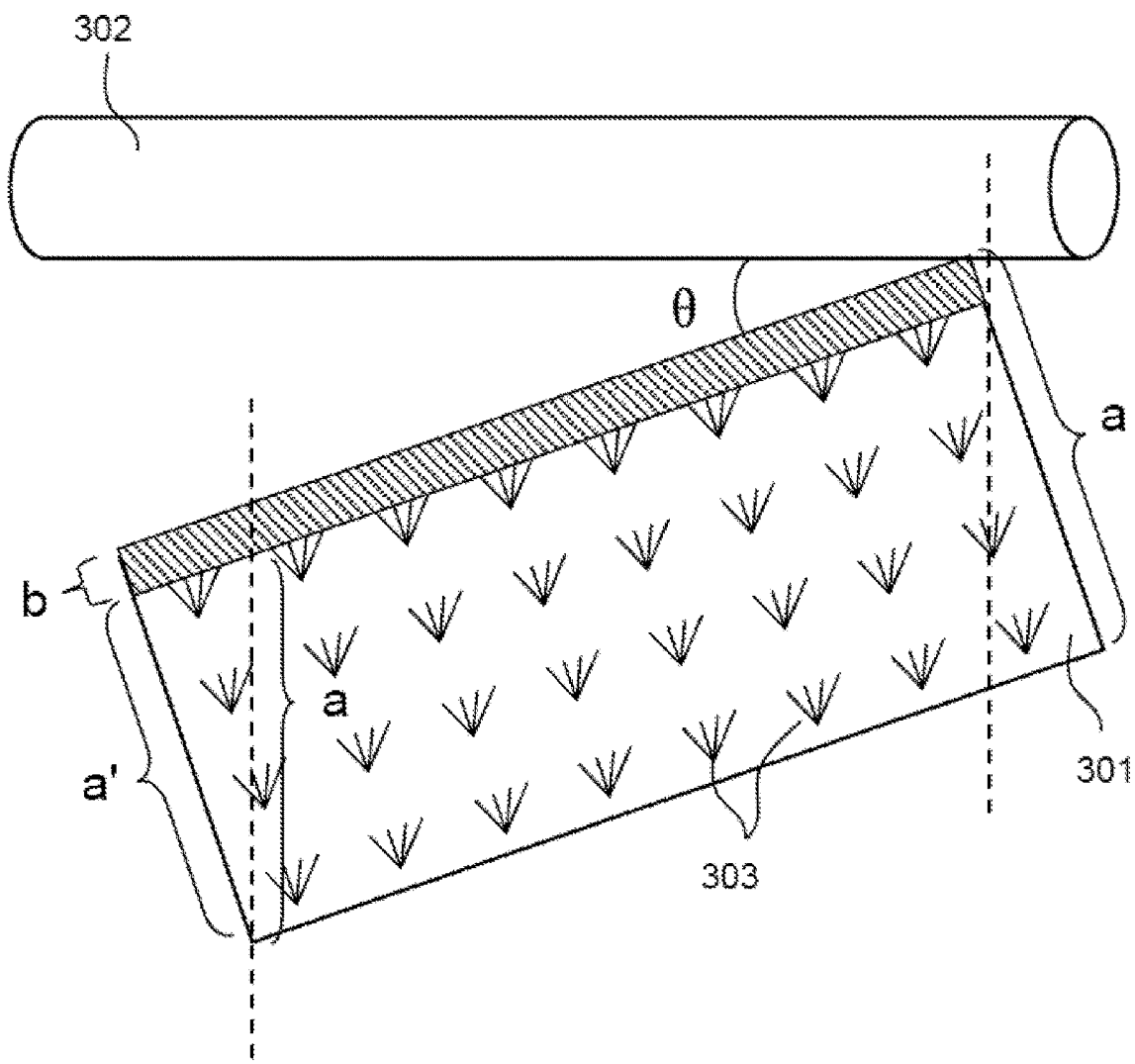
FIG. 4 is a schematic diagram of the tailoring manner for rubbing cloth provided by an embodiment of the present invention.

FIG. 4 is a schematic diagram of the tailoring manner for rubbing cloth provided by an embodiment of the present invention. Optionally, the original width a of the rubbing cloth 301 is equal to the perimeter of the roller body 302; before winding the rubbing cloth 301 obliquely around the cylindrical surface of the roller body 302, the method further comprises: tailoring the width of the rubbing cloth 301 to the perimeter of the roller body×cos θ. From FIG. 4 it can be seen that a'/a=cos θ. Therefore, the region of a width b=a×(1−cos θ) should be cut off.

It can be understood by those skilled in the art that in order to eliminate the oblique edges on both ends of the roller body as shown in FIG. 2, the rubbing cloth can be further tailored based on the two dash lines as shown in FIG. 4. The dash line passes through the right angle vertex of the tailored rubbing cloth as shown in FIG. 4; an angle equal to θ is formed between the dash line and the shorter side of the rubbing cloth. The operating width of the rubbing roller provided by this method is defined by the distance between these two dash lines as shown in FIG. 4. During the process of rubbing orientation, it is desired that the operating width of the rubbing roller is greater than or equal to the width of the substrate to be processed.

Optionally, 0°<θ≤30°.

The azimuth angle of the rubbing direction should be considered with the azimuth angle of the rubbing cloth and the oblique angle θ. If the oblique angle θ is out of the range of 0°~30°, there may be a risk of other defects on the image quality.

Optionally, θ=10° or θ=20°. Alternatively, θ=30°.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A method for manufacturing a rubbing roller, comprising:
   providing a rubbing cloth and a cylindrical roller body; a surface of the rubbing cloth being provided with a rectangular tuft array; the rubbing cloth having a rectangular shape; an original width of the rubbing cloth being equal to the perimeter of the roller body; rows and columns composed of the tufts are respectively parallel to two adjacent sides of the rubbing cloth;
   tailoring the original width of the rubbing cloth equal to the perimeter of the roller body multiplied by cos θ; θ being an angle to be formed between a length direction of the tailored rubbing cloth and a generatrix of the cylindrical surface; and
   winding the tailored rubbing cloth obliquely around a cylindrical surface of the roller body, forming the angle θ between the length direction of the tailored rubbing cloth and the generatrix of the cylindrical surface, thereby increasing a density of rubbing loci generated by the tufts without increasing a density of the tuft array of the rubbing cloth,
   wherein $0° < θ ≤ 30°$.

2. The method according to claim 1, wherein $θ=10°$.

3. The method according to claim 1, wherein $θ=20°$.

4. The method according to claim 1, wherein $θ=30°$.

* * * * *